US007005007B2

(12) United States Patent
Kehrmann

(10) Patent No.: US 7,005,007 B2
(45) Date of Patent: Feb. 28, 2006

(54) HYDRAULIC BINDER

(75) Inventor: Alexander Kehrmann, Vulkanstrasse 54, 47053 Duisburg (DE)

(73) Assignee: Alexander Kehrmann, Xanten (DE)

( * ) Notice: Subject to any disclaimer, the term of this patent is extended or adjusted under 35 U.S.C. 154(b) by 0 days.

(21) Appl. No.: 10/664,434

(22) Filed: Sep. 18, 2003

(65) Prior Publication Data

US 2005/0011414 A1 Jan. 20, 2005

(30) Foreign Application Priority Data

Jul. 17, 2003 (DE) .......................... 203 11 049 U

(51) Int. Cl.
*C04B 7/00* (2006.01)

(52) U.S. Cl. ...................... 106/733; 106/736; 106/737; 106/815

(58) Field of Classification Search ................ 106/733, 106/736, 737, 815
See application file for complete search history.

(56) References Cited

U.S. PATENT DOCUMENTS

| | | | | |
|---|---|---|---|---|
| 3,663,286 | A * | 5/1972 | De Barrau | 106/819 |
| 4,415,367 | A * | 11/1983 | Nelson | 106/718 |
| 4,784,691 | A * | 11/1988 | Rasmussen | 106/89 |
| 6,277,190 | B1 * | 8/2001 | Schulte et al. | 106/802 |
| 6,740,156 | B1 * | 5/2004 | Kehrmann | 106/733 |

FOREIGN PATENT DOCUMENTS

| | | |
|---|---|---|
| DE | 197 44 035 A1 | 4/1999 |
| DE | 100 14 468 A1 | 7/2001 |

OTHER PUBLICATIONS

English translation of DE 201 19 021; Mar. 2002.*
English translation of DE 100 14 468; Oct. 2003.*
Manns, W.; Laskowski, Ch. “Eisen-(II)-sulfat als Zusatz zur Chromatreduzierung” [*Iron-(II)-sulfate for chromate reduction*] in BE-Z: Beton [*Concrete*], journal Feb. 1999, pp. 78-85.

* cited by examiner

*Primary Examiner*—Elizabeth D. Wood
(74) *Attorney, Agent, or Firm*—Henry M. Feiereisen

(57) ABSTRACT

A hydraulic binder includes cement as main ingredient, and a mixture added to the cement and made of moist green vitriol and a drying agent selected from the group consisting of dry sand with a granulation between 0.1 mm and 0.4 mm, catalytic dust, silica gel and alumina.

6 Claims, No Drawings

HYDRAULIC BINDER

CROSS-REFERENCES TO RELATED APPLICATIONS

This application claims the priority of German Patent Application, Serial No. 203 11 049.8, filed Jul. 17, 2003, pursuant to 35 U.S.C. 119(a)–(d), the disclosure of which is incorporated herein by reference.

BACKGROUND OF THE INVENTION

The present invention relates to, in general, to a hydraulic binder, and more particularly to a hydraulic binder having as main component cement and iron-(II)-sulfate added to the cement for reduction of chromate.

Cement is typically used in the construction industry as finely ground hydraulic binder for making concrete, mortar, concrete stones and finished parts. Oftentimes, cement is manually processed. This is disadvantageous because typical cement contains chromate which can trigger allergic reactions such as skin eczema, so-called cement dermatitis or bricklayer scabies.

Chromate-containing cement includes up to 100 ppm of chromium(VI) compounds (chromates) of which about 20% are soluble. Soluble chromate is the cause of the allergic cement eczemas. By utilizing cement which is almost free of chromate and cement-containing preparations that are low in chromate, for example, tile adhesive or dry mortar, diseases of this type can be effectively eliminated. For that reason, cement-containing materials which are handled manually are produced exclusively with low content of chromate. Chromate-containing cement means a cement which contains less than 2 ppm of water-soluble chromium(VI) relative to the dry mass.

It is known, to decrease the chromate content in cement through addition of a reducing agent, e.g. iron-(II)-sulfate. German patent publication no. DE 197 44 035 A1 describes the addition of dry iron-(II)-sulfate particles to cement at an amount of 0.01 to 1 wt. %, when the cement is withdrawn from a large silo. During preparation of the mortar or concrete mixture, the granular iron-(II)-sulfate dissolves in the mixing water and contacts the chromate(VI) during mixture to thereby chemically reduce it.

Also Manns, W.; Laskowski, Ch. describe in an article, entitled Eisen-(II)-sulfat als Zusatz zur Chromatreduzierung [Iron-(II)-sulfate for chromate reduction] in BE-Z: Beton [Concrete], journal 2/1999, pages 78–85, the use of dry powdery iron-(II)-sulfate for chromate reduction.

Dry iron-(II)-sulfate looses, however, effectiveness as a result of oxidation with atmospheric oxygen. Therefore, iron-(II) sulfate has been added to cement only at a time when the cement is withdrawn from the large silo to thereby decrease the risk of undesired reaction as the granular iron-(II) sulfate is added to the cement.

German patent publication no. DE 100 14 468 A1 describes the production of a building material made from a mixture of cement, water and additives and the addition of moist iron-(II)-sulfate, so-called green (iron) vitriol, to the mixture. To improve handling of moist green vitriol, a dry material is added, e.g., ground limestone.

It would be desirable and advantageous to provide an improved hydraulic binder which is more cost-efficient and yet reliable in use.

SUMMARY OF THE INVENTION

According to one aspect of the present invention, a hydraulic binder includes cement as main ingredient, and a mixture added to the cement and made of moist green vitriol and a drying agent, wherein the drying agent is a dry sand with a granulation between 0.1 mm and 0.4 mm.

Tests have shown that dry sand with a granulation between 0.1 mm and 0.4 mm affords very good properties as drying agent in the mixture with moist green vitriol (iron-(II)-sulfate). An example of a dry sand which is especially effective as a consequence of its coarse porosity and its large inner surface is a dry sand that is commercially available under the trade name SIPOR.

According to another aspect of the present invention, a hydraulic binder includes cement as main ingredient, and a mixture added to the cement and made of moist green vitriol and a drying agent, wherein the drying agent is catalytic dust. An example of a catalytic dust includes catalytic particles obtained by the Claus process, i.e. desulphurization processes used in particular in oil refinery or natural gas refinery. Catalytic dust is added to the green vitriol. In this way, an industrial product can be supplied for an appropriate further processing. Catalytic dust obtained by the Claus method is also characterized by a large inner surface and good moisture adsorption capability.

According to still another aspect of the present invention, a hydraulic binder includes cement as main ingredient, and a mixture added to the cement and made of moist green vitriol and a drying agent, wherein the drying agent is silica gel. Suitably, the silica gel has a great pore volume. Silica gel involves a solid amorphous silicic acid which is known for use as adsorption agent for gas, vapor and liquids and can be made with pores of different diameter. Silica gels exhibit a large inner surface, which may range up to 800 $m^2/g$, in order to absorb liquid. Silica gel may bind up to 300 water molecules per silicon dioxide molecule as water of crystallization.

Silica gel can be manufactured synthetically as condensation product from silicon dioxide. Hereby, sodium silicate may be mixed with a mineral acid, e.g. sulfuric acid. A sol ($SiO_2$, $Na_2SO_4$, $H_2O$) is produced from these materials and allowed to solidify to form jelly which is then crushed and, optionally, aftertreated to adjust various properties, such as pore volume, pore diameter and inner surface.

According to yet another aspect of the present invention, a hydraulic binder, includes cement as main ingredient, and a mixture added to the cement and made of moist green vitriol and a drying agent, wherein the drying agent is alumina. Preferably, the drying agent is activated alumina, i.e. activated aluminum oxide ($Al_2O_3$). Involved here is a natural clay mineral (bentonite) in crumbly form with similar adsorption capability for moisture as silica gel.

The mixture of moist green vitriol as iron-(II)-sulfate supplier with the drying agent yields a pourable product. The drying agent assumes within the mixture a drying function and the function as moisture buffer or moisture control. The drying and buffer effects of the drying agent ensure an optimum adjustment of the mixture. Oxidation with atmospheric oxygen is avoided as is lumping. There is no need for a laborious preparation or drying of the green vitriol before its use, as the moisture control is assumed by the drying agent.

The mixture has a granulation that enables a processing with a wide variety of metering aggregates in a precise manner at exactly predeterminable amounts. Even when using the hydraulic binder according to the invention in combination with a building material, for example during plaster work, the result is a very fine building material that is superior for subsequent handling.

The mixture can be classified to the desired grain size or fineness by using mechanical processing devices, e.g., mills such as ball mills. In this way, the mixture of green vitriol and drying agent can be prepared with relatively little expenditure and can easily be added to the cement.

According to another feature of the present invention, an acidifying agent may be added to any of the afore-stated mixtures for decreasing the pH value.

Common to all embodiments of the present invention, is the utilization of fine-grained to powdery inert materials with large surface structure as drying agent. These materials have hygroscopic properties, i.e. they are able to absorb moisture but also able to release moisture.

BRIEF DESCRIPTION OF THE DRAWING (None)

DETAILED DESCRIPTION OF PREFERRED EMBODIMENTS

The following description is to be understood as illustrative of the invention and not limiting in any way.

The hydraulic binder according to the present invention is made of cement to which a mixture of iron-(II)-sulfate as chromate reducer and a drying agent is added. The drying agent may be dry sand with a granulation between 0.1 mm and 0.4 mm, or catalytic sand, or silica gel, or alumina. Optionally, an acidifying agent may be added in order to reduce the pH value of the mixture. The acidifying agent adjusts an acidic environment in the cement to thereby prolong the reactivity of the iron-(II)-sulfate and thus the storage stability of the cement. The invention exploits the fact that cement as such is alkaline while iron-(II)-sulfate is acidic. During storage, alkaline components, such as alkaline components of cement, progressively neutralize the iron-(II)-sulfate. Through addition of the acidifying agent, this neutralization process is countered so that the storage stability of the hydraulic binder is significantly increased. Tests have shown that the storage stability can be prolonged by more than factor 2 compared to conventional cement mixtures.

As Iron-(II)-sulfate contains sulfuric acid anyway, sulfuric acid ($H_2SO_4$) is used as acidic agent. Sulfuric acid is suitably mixed in liquid form to the moist green vitriol. Subsequently, the mixture is prepared and adjusted with the drying agent for subsequent addition to the cement.

It will be understood by persons skilled in the art that sulfuric acid may also be added in the form of its salts of the sulfates. Although the use of sulfuric acid is currently preferred, the invention should not be limited thereto because it is, of course, also possible to use different acidifying agents in liquid or solid form, for example, hydrochloric acid. Basically, all acidifying agents are suitable that are capable to reduce the pH value of iron-(II)-sulfate. The pH value of the mixture of iron-(II)-sulfate and acidifying agent should be under 4, preferably between 2 and 3.

Green vitriol is obtained as waste or byproduct during various industrial processes, e.g., production of titanium dioxide from titaniferous ore. During titanium dioxide production according to the sulfate process, the finely ground titaniferous ore is solubilized with concentrated sulfuric acid. Iron oxide contained in the ore reacts to iron sulfate while the titaniferous ore reacts to titanium sulfate. Separation of the iron sulfate from the titanium sulfate is realized through crystallization. Due to the higher water solubility, iron sulfate crystallizes into green iron-(II)-sulfate and can be extracted. The so-obtained green vitriol is thus a waste product of the titanium dioxide production. Its consistence is moist but still retains the same chemical properties, in particular as far as chromate(VI) reduction is concerned. Green vitriol is hereby significantly more cost-efficient.

The acidifying agent is added at an amount between 0.5 weight % to 10 weight %, preferably between 1 weight % and 3 weight %, in relation to the amount of iron-(II)-sulfate. In this way, the intended acidic milieu of the binder can be reliably adjusted.

The fraction of drying agent ranges suitably between 5 weight % and 15 weight %, in particular at about 10 weight %, in relation to the amount of green vitriol. This range ensures the function of the drying agent as moisture buffer or moisture control.

The mixture of green vitriol and drying agent is added at an amount between 0.01 weight % to 5.0 weight % in relation to the amount of cement. This range ensures an effective reduction of the chromate content to below the limits that are considered health hazards.

Mechanical properties, e.g. mechanical strength or tendency to flow, of the building material made with the hydraulic binder according to the invention can be adjusted by adding additives, for example zinc, aluminum, phosphor, or titanium oxide, to the mixture of green vitriol and inert drying material. Zinc, for example, promotes strength and is added at an amount of less than 10 weight %. Phosphorus retards the setting time of the cement and is, typically, also added at an amount of less than 10 weight %.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A hydraulic binder, comprising:

cement as main ingredient; and a mixture added to the cement and made of moist green vitriol and a drying agent, wherein the drying agent is catalytic dust.

2. The hydraulic binder of claim 1, and further comprising an acidifying agent added to the mixture for decreasing the pH value.

3. A hydraulic binder, comprising:

cement as main ingredient; and a mixture added to the cement and made of moist green vitriol and a drying agent, wherein the drying agent is silica gel; and an acidifying agent added to the mixture for decreasing the pH value.

4. A hydraulic binder, comprising:

cement as main ingredient;

a mixture added to the cement and made of moist green vitriol and a dying agent, wherein the drying agent is alumina; and an acidifying agent added to the mixture for decreasing the pH value.

5. The hydraulic binder of claim 1, wherein the catalytic dust is obtained by the Claus process.

6. The hydraulic binder of claim 4, wherein the drying agent is activated aluminum oxide ($Al_2O_3$).

* * * * *